(12) United States Patent
Harris

(10) Patent No.: US 6,710,860 B1
(45) Date of Patent: Mar. 23, 2004

(54) METHOD OF ALIGNING A BISTATIC DOPPLE SENSOR APPARATUS

(76) Inventor: Michael Harris, The Old Chapel, Chase Road, Upper Welland, Malvern, Worcestershire (GB), WR14 4JY ( * ) Notice: Subject to any disclaimer, the term of this patent is extended or adjusted under 35 U.S.C. 154(b) by 0 days.

(21) Appl. No.: 10/129,790
(22) PCT Filed: Nov. 9, 2000
(86) PCT No.: PCT/GB00/04286
§ 371 (c)(1),
(2), (4) Date: May 23, 2002
(87) PCT Pub. No.: WO01/35117
PCT Pub. Date: May 17, 2001

(30) Foreign Application Priority Data

Nov. 10, 1999 (GB) .............................................. 9926516

(51) Int. Cl.⁷ ............................. G01P 3/36; G01B 11/26
(52) U.S. Cl. .................... 356/28.5; 356/4.01; 356/138.1
(58) Field of Search ...................... 356/28, 28.5, 138.1, 356/153, 152.1, 4.01

(56) References Cited

U.S. PATENT DOCUMENTS

| | | | | |
|---|---|---|---|---|
| 4,432,640 A | | 2/1984 | Grage et al. | |
| 5,267,011 A | * | 11/1993 | Callender | .................. 356/28.5 |
| 5,272,513 A | | 12/1993 | Vahala et al. | |
| 5,621,514 A | * | 4/1997 | Paranto et al. | ............. 356/5.09 |
| 5,847,817 A | * | 12/1998 | Zediker et al. | ............ 356/5.09 |
| 5,875,024 A | | 2/1999 | Seelhorst et al. | |
| 6,020,955 A | * | 2/2000 | Messina | ...................... 356/138 |

* cited by examiner

Primary Examiner—Stephen C. Buczinski
(74) Attorney, Agent, or Firm—Nixon & Vanderhye P.C.

(57) ABSTRACT

Doppler sensor apparatus has means outputting coherent electromagnetic radiation (2), means (4) for transmitting radiation from the source means (2) to a point in space, means (6) for receiving radiation reflected from the point in space and means (8) for determining any Doppler shift in the reflected radiation. The transmitting means (2) and the receiving means (4) are separate, and the transmitting means (2) and the receiving means (4) are each adapted to have radiation guiding means (26, 28) releasably attached thereto, thereby enabling radiation guiding means (26, 28) for routing radiation from the source means (2) to the transmitting means (4) and from the receiving means to the determining means (8) to be interchanged with radiation guiding means (34, 36) for routing radiation for use in aligning the transmitting means (4) and the receiving means (6) to the transmitting means (4) and to the receiving means (6).

17 Claims, 2 Drawing Sheets

METHOD OF ALIGNING A BISTATIC DOPPLE SENSOR APPARATUS

Figure 1:
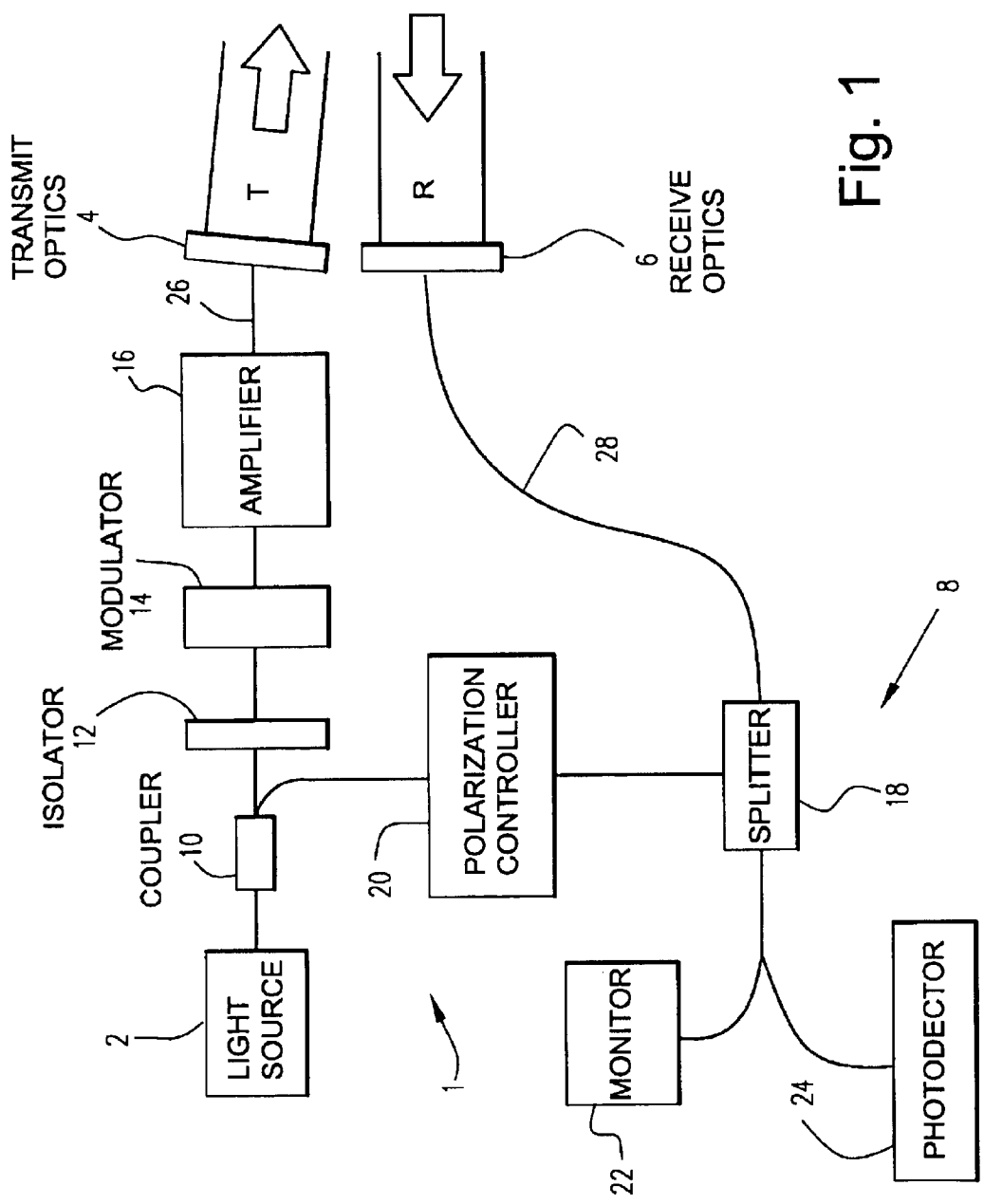

The invention relates to the measurement of particle velocities using Doppler techniques.

Wind speed determination is required in many fields such as, for instance, meteorology and aeronautics: for example, there may be a need to ascertain an aircraft's true airspeed or its wake velocity. Known methods of determining wind speed use continuous wave coherent laser Doppler velocimetry. Airborne particles are assumed to be moving at the same speed as the air in which they are suspended. Thus, wind speed may be determined by measuring the Doppler shift in laser light reflected from the particles passing through a particular volume of the air. The particular volume is commonly called the probe volume. The Doppler shift is measured to a high accuracy by beating ("heterodyning") the reflected light signal.

Monostatic laser Doppler velocimetry systems are so called because they have common transmit and receive optics. A beam of laser light is transmitted from the system to the spatial region within which the wind speed is to be determined. Laser light reflected from airborne particles back into the same optics is analysed to determine wind speed. Spatial resolution is achieved by focusing the transmitted beam into the spatial region. In practice, diffraction restricts monostatic systems to ranges of a few hundred meters. Moreover, slow drop-off in sensitivity away from the focus may result in a poorly defined probe volume. As a consequence, clouds, smoke or other objects away from the probe volume may result in the generation of spurious reflections. Thus, where precise localisation of wind speed is required for instance, in wind tunnel studies, monostatic systems are not ideally suited.

Bistatic systems, which derive their name from having separate transmit and receive optics, are better suited to localised wind speed measurements. The optical set up in a bistatic system means that non-parallel transmitted and "received" beams can be arranged to intersect, thereby providing a well-defined probe volume. Confinement of the probe volume is advantageous for the reasons stand above, although it may lead to a reduction in signal power: in general, higher range resolution is accompanied by a greater reduction in carrier-to-noise ratio. For satisfactory alignment, the transmitted and "received" beam foci must coincide at the intersection, which can be problematical to achieve.

Disclosed in U.S. Pat. No. 5,875,024 is a Doppler sensor apparatus having separate transmit and receive optics, and light from a laser source is coupled into the output of the receive optics for use in aligning the transmit and receive optics.

The invention provides Doppler sensor apparatus comprising means outputting coherent electromagnetic radiation, means for transmitting radiation from the source means to a point in space, means for receiving radiation reflected from the point in space, means for determining any Doppler shift in the reflected radiation, wherein the transmitting means and the receiving means are separate, and wherein the radiation receiving means and the radiation transmitting means are each adapted to have radiation guiding means releasably attached thereto, thereby enabling radiation guiding means for routing radiation from the source means to the transmitting means and from the receiving means to the determining means to be interchanged with radiation guiding means for routing radiation for use in aligning the transmitting means and the receiving means simultaneously to the transmitting means and to the receiving means.

The apparatus according to the invention provided a well-defined probe volume for Doppler sensing, and effective rejection of any scattered radiation originating from outside of the volume close to the point in space.

Having releasably attachable radiation guiding means enables the straightforward interchange of components of the apparatus facilitating the determination of Doppler shift and component failitating the alignment of the transmitting and receiving means. Hence, satifactory alignment of the transmitting and recieveing means may be achieved with the minimum of difficulty. In addition, the transmitting means and the receiving means may be remote from the remainder of the apparatus which may be of assistance for measurements in awkward or hostile environments. The more delicate or expensive components can be positioned in a safe location.

Preferably, the radiation guiding means is optical fibre means. The optical fibre means may be a single-made optical fibre.

Also preferably, radiation is guided between the optical components of the apparatus by optical fibre means.

Further preferably, the source means is a semiconductor laser. The semiconductor laser may be an external cavity semiconductor laser diode.

The apparatus may comprise first means for splitting the radiation from the source means between two first outputs. In the event that the radiation is guided between components by optical fibre means, the first means may be a fibre coupler.

The apparatus may also comprise an isolator, for transmitting radiation in one direction only. This can be used to eliminate the problems of feedback into the source, which can adversely affect noise levels. In the optical environment, such isolators are known as optical diodes.

The apparatus may further comprise an amplifier for raising the power of the transmitted radiation to a level sufficient to permit reliable detection of the reflected radiation. Again, in the event that the radiation is guided between components by optical fibre means, the amplifier may be an erbium-doped fibre amplifier.

The apparatus may also further comprise a modulator. In the optical environment; an acousto-optic modulator may be used to shift the frequency of the radiation output by the source thereby enabling discrimination between positive and negative Doppler shift.

The radiation guiding means for guiding radiation for use in aligning the transmitting means and the receiving means may comprise second means for splitting the radiation from one of the first outputs between two second outputs and radiation guiding means for guiding radiation from the two second outputs to transmitting means and the receiving means. Alternatively, the radiation for use in aligning the transmitting means and the receiving means may be obtained from a separate source.

The apparatus may yet further comprise a polarisation controller for matching the state of polarisation of the received radiation with the reference (local oscillator) radiation. Alternatively, polarisation preserving radiation guiding means or optical fibre means may be used.

The apparatus may in addition comprise means for combining radiation from the second of the two first outputs with radiation from the receiving means and for splitting the combined radiation between two third outputs.

The determining means may comprise monitoring means for receiving radiation from a first of the third outputs and detector means for receiving radiation from the second of the third outputs.

The receiving means may have first and second receiving inputs each receiving different reflected radiation from the point in space.

Aligning the transmitting means and the receiving means may involve using a beam profiler or, alternatively, using apertures and/or fluorescent cards.

The apparatus according to the invention is particularly suited to use as a continuous wave Doppler wind sensor.

The invention further provides, in Doppler sensor apparatus having means outputting coherent electromagnetic radiation, means for transmitting radiation from the source means to a point in space, means for receiving radiation reflected from the point in space, means for determining any Doppler shift in the reflected radiation, wherein the transmitting means and the receiving means are separate, a method of aligning the transmitting means and the receiving means comprising transmiting radiation simultaneously from the transmitting means and the receiving means and adjusting the position of the transmitting means and the receiving means until the radiation transmitted by each intersects.

Figure 2:
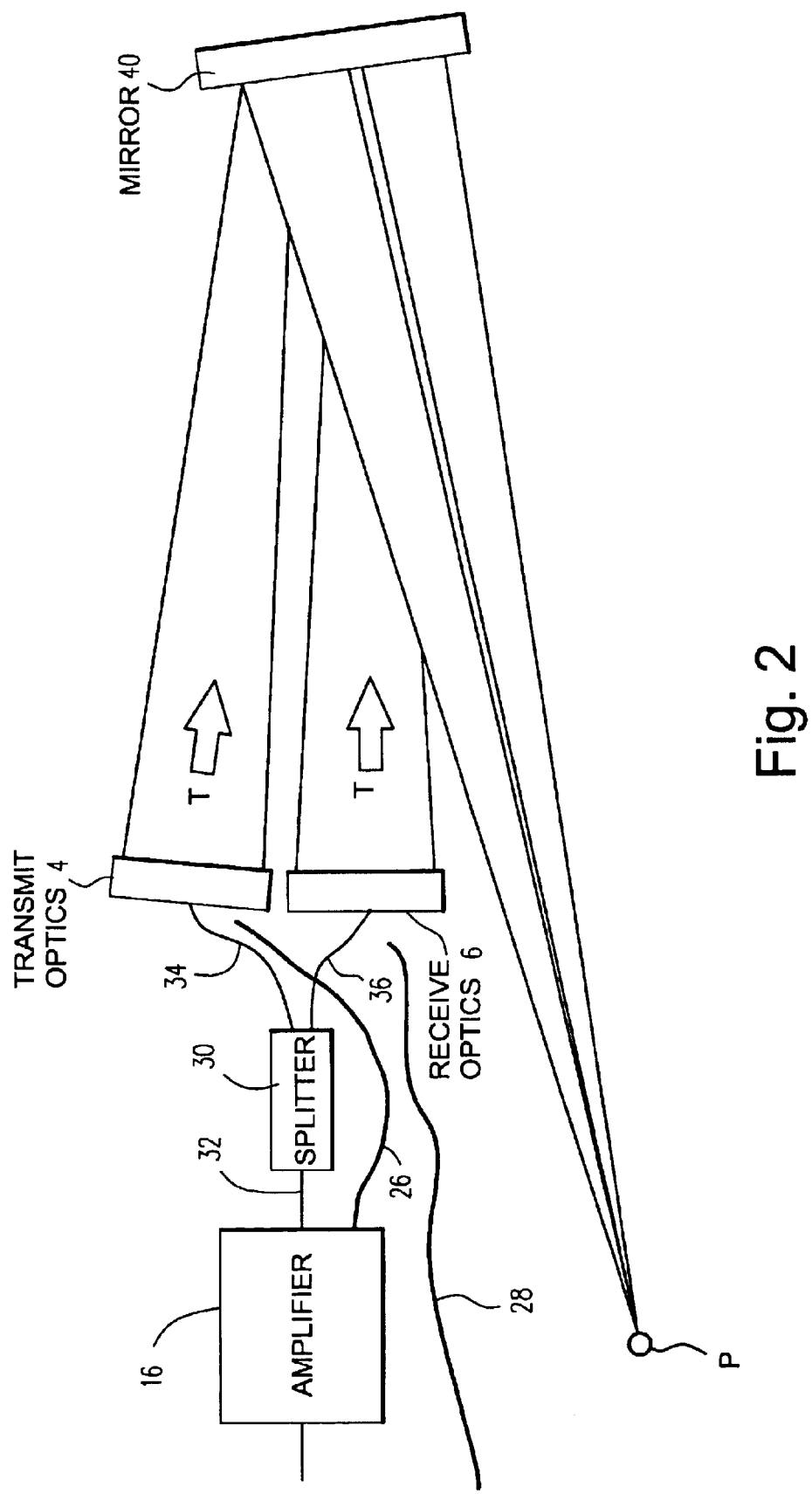

The invention will now be described, by way of example, with reference to the following drawings, in which:

FIG. 1 is a schematic illustration of Doppler sensor apparatus according to the invention; and, FIG. 2 is a schematic illustration of a configuration of the apparatus shown in FIG. 1 during the alignment step in the setting up of the apparatus.

With reference to FIG. 1, indicated generally at 1 is bistatic laser Doppler wind speed measurement apparatus having a high coherence, external cavity semiconductor laser light source 2 with a 7 mW output, serving as a master oscillator Transmit optics 4 transmit light from the source 2 to a point in space (not shown), receive optics 6 receive light reflected from the point in space and determining means 8 analyse the reflected light in comparison to the transmitted light.

Airborne particles are assumed to travel at the same speed as the air in which they are suspended. Therefore, the speed with which particles pass any point in space is an indicator of the wind speed at that point. Light from the source 2 is transmitted via the transmit optics 4 to the point at which wind speed is to be determined. Particles passing that point impinge upon the transmitted light and light is reflected form the particles to the receive optics 6. As the particles are moving,—the light reflected therefrom is subject to a Doppler shift and, by determining the magnitude of the shift, it is possible to ascertain the component of the particles' speed along the axis defined as the bisector of the angle subtended at the probe volume by the path followed by the transmitted light and the path followed by the reflected light.

Light from the source 2 is guided through a 1×2 coupler 10. Light from one of the outputs of the 1×2 coupler 10 is passed to an optical Faraday isolator 12 which prevents feedback into the source 2. Such feedback could adversely affect noise levels. Light from the isolator 12 is guided through an acousto-optic modulator 14 to impose a frequency offset which enables discrimination according to the direction of motion of the particles in relation to the apparatus 1. The light is then amplified in an erbium doped fibre amplifier 16 to a power of approximately 1 W, which is a level sufficient to ensure that the reflected radiation is detectable. From the amplifier 16, the light is sent to the transmit optics 4 for transmission to the point in space. Such an arrangement is commonly known as a master oscillator power amplifier, which is considered to minimise losses. The light transmitted by the transmit optics 4 has a wavelength of 1.55 $\mu$m.

Light from the second of the outputs of the 1×2 coupler 10 serves as the local oscillator and is sent to one of the inputs of a 2×2 splitter 18 via a fibre polarisation controller 20 which achieves polarisation matching between the source output and the received light, ensuring optimised light beating for heterodyne detection. The other input to the 2×2 splitter 18 is supplied with the reflected light received by the receive optics 6. The 2×2 splitter 18, a monitor 22 and an InGaAs photodetector 24 together constitute the determining means 8. Light from each of the outputs of the 2×2 splitter 18 is sent to the monitor 22 and the detector 24 respectively, where the frequency and Doppler shift in the reflected light is determined by beating.

Light is guided between all of the optical components in the apparatus 1 by single mode optical fibres (such as those available from the Corning Company under the designation SMF-28). In particular light is guided from the amplifier 16 to the transmit optics 4 and from the receive optics 6 to the 2×2 splitter 18 by optical fibres 26, 28 respectively. The transmit optics 4 (not shown) has a doublet achromat lens, and an optical fibre connector on a 3-D translation stage. Light emerges from the transmit fibre 26 and is incident upon a 30 mm diameter positive doublet lens of 100 mm focal length. The receive optics 6 have exactly the same structure as the transmit optics 4. Each of the fibres 26, 28 is releasably attachable using the corresponding fibre connector. A fibre connector is also provided at the amplifier 16 so that the transmit fibre 26 is releasably attachable thereto. The components are attached together via FC/PC or FC/APC connectors.

With reference also to FIG. 2, to align the transmit and receive optics 4, 6, the fibres 26, 28 are detached from the transmit and receive optics 4, 6 and the amplifier 16. Attached therebetween instead is a 1×2 splitter 30 with its optical fibre input 32 supplied by the amplifier 14 and each of its optical fibre outputs 34, 36 supplying one of the transmit and receive optics 4, 6. Thus, temporarily, during the alignment process, both the transmit and receive optics 4, 6 are used for transmitting. The transmit and receive optics 4, 6 are focused until the light transmitted by each intersects at the point at which wind speed is to be determined. Focusing involves positioning a beam profiler (not shown) in a plane including the desired point of intersection. This gives a real-time quantitative measure of the transmitted beams radiation for use in aligning the transmitting means (4) and the receiving means (6) comprises second means (30) for splitting the radiation from one of the first outputs between two second outputs and radiation guiding means for guiding radiation from the two second outputs to transmitting means and the receiving means widths and their positions. The widths are minimised, then optimally superimposed. The 3-D translation stages of each of the transmit and receive optics 4, 6 enable them to be slid, rotated etc and their positions altered. For ease of adjustment, a mirror 40 is used to reflect the transmitted light beams to a virtual point of coincidence P adjacent the transmit and receive optics 4, 6. Once alignment has been achieved, the fibres 26, 28, connecting the amplifier 16 to the transmit optics 4 and the receive optics 6 to the splitter 18, are reinstated without disturbing the position of the transmit and receive optics 4, 6, and measurement of wind speed commences. Wind speeds are determined, typically at approximately 100 m away from the apparatus, from the detector output which is processed by SAW, DSP or similar spectral analysis.

Therefore, by having means enabling the optical fibres 24, 26 to be releasably attached, the transmit and receive optics 4, 6 may be readily interchanged selectively between components necessary for taking measurements and components enabling alignment of the transmit and receive optics 4, 6.

What is claimed is:

1. A Doppler sensor apparatus comprising:
   a laser source,
   transmit optics,
   receive optics,
   a Doppler shift determiner,
   a first guide optically connecting said laser source and said transmit optics,
   a second guide optically connecting said receive optics and said Doppler shift determiner,
   a third guide connecting said laser source to said transmit optics for alignment adjustment,
   a fourth guide connecting said receive optics with said Doppler shift determiner for alignment adjustment,
   wherein said transmit optics are separate from said receive optics, said first and third guides are releasably attachable to said transmit optics and said second and fourth guides are releasably attachable to said receive optics, enabling said first and second guides to be interchanged with third and fourth guides, respectively.

2. Apparatus according to claim 1 wherein radiation generated by said laser source is guided between components of the apparatus by optical fibers.

3. Apparatus according to claim 1 wherein the laser source is a semiconductor laser.

4. Apparatus according to claim 1 further including a beam splitter for splitting the radiation from the laser source between two first outputs.

5. Apparatus according to claim 1 further comprising an isolator.

6. Apparatus according to claim 1 further comprising an amplifier.

7. Apparatus according to claim 1 further comprising a modulator.

8. Apparatus according to claim 4 further including a second beam splitter wherein the radiation from one of said first outputs is split by said second beam splitter between two second outputs and radiation from the two second outputs is guided by said third and fourth optical guides to said transmit optics and said receive optics.

9. Apparatus according to claim 1 further comprising a polarisation controller.

10. Apparatus according to claim 4 further comprising a beam combiner for combining radiation from the second of the two first outputs with radiation from said receive optics and a third beam splitter for splitting the combined radiation between two third outputs.

11. Apparatus according to claim 10 further comprising monitoring means for receiving radiation from a first of the third outputs and a detector for receiving radiation from the second of the third outputs.

12. Apparatus according to claim 1 wherein said receive optics has first and second receiving inputs each receiving radiation reflected from a point in space.

13. Apparatus according to claim 1 wherein any one of said first, second, third and fourth guides is an optical fiber.

14. A method of aligning a bistatic Doppler sensor apparatus comprising the steps of:
   (a) providing a Doppler sensor apparatus as claimed in claim 1,
   (b) detaching said first guide from said transmit optics and said second guide from said receive optics,
   (c) attaching said third guide to said transmit optics and said fourth guide to said receive optics,
   (d) supplying radiation via said third and fourth guides to said transmit optics and said receive optics, and
   (e) adjusting said transmit optics and said receive optics until the radiation transmitted by said transmit optics and said receive optics intersects.

15. A method according to claim 14 and comprising the additional steps of
   (f) detaching said third guide from said transmit optics and said fourth guide from said receive optics, and
   (g) re-attaching sad first guide to said transmit optics and said second guide to said receive optics.

16. In Doppler sensor apparatus having means outputting coherent electromagnetic radiation, means for transmitting radiation from the source means to a point in space, means for receiving radiation reflected from the point in space, means for determining any Doppler shift in the reflected radiation, wherein the transmitting means and the receiving means are separate, a method of aligning the transmitting means and the receiving means characterised by transmitting radiation simultaneously from the transmitting means and the receiving means and adjusting the position of the transmitting means and the receiving means until the radiation transmitted by each intersects.

17. A method of aligning Doppler sensor apparatus comprising the steps of:
   (a) providing a Doppler sensor apparatus having separate transmit and receive optics,
   (b) transmitting radiation simultaneously from said transmit optics and said receive optics, and
   (c) adjusting the position of said transmit optics and/or said receive optics until the radiation transmitted by said transmit optics and said receive optics intersects.

* * * * *

UNITED STATES PATENT AND TRADEMARK OFFICE
CERTIFICATE OF CORRECTION

| | | |
|---|---|---|
| PATENT NO. | : 6,710,860 B1 | Page 1 of 1 |
| APPLICATION NO. | : 10/129790 | |
| DATED | : March 23, 2004 | |
| INVENTOR(S) | : Harris | |

It is certified that error appears in the above-identified patent and that said Letters Patent is hereby corrected as shown below:

Title page, item (54) and Col. 1, line 2 Title, "DOPPLE" should read --DOPPLER--

Title page, insert item --(73) Assignee: QinetiQ Limited, Farnborough (GB)--

Signed and Sealed this
Nineteenth Day of April, 2011

David J. Kappos
*Director of the United States Patent and Trademark Office*